US010324497B1

(12) United States Patent
Perelli et al.

(10) Patent No.: US 10,324,497 B1
(45) Date of Patent: Jun. 18, 2019

(54) TIERED COMPUTING DEVICE

(71) Applicant: Lenovo (Singapore) Pte. Ltd., Singapore (SG)

(72) Inventors: Thomas Perelli, Raleigh, NC (US); Cuong Huy Truong, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/941,307

(22) Filed: Mar. 30, 2018

(51) Int. Cl.
*G06F 1/16* (2006.01)
*H02J 50/20* (2016.01)

(52) U.S. Cl.
CPC .......... *G06F 1/1637* (2013.01); *G06F 1/1635* (2013.01); *G06F 1/1669* (2013.01); *H02J 50/20* (2016.02); *G06F 2200/1631* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,504,529 B1* | 1/2003 | Inagaki | ................ | G06F 1/1616 341/20 |
| 8,251,322 B2* | 8/2012 | Vincent | ................ | F16M 11/00 248/126 |
| 8,300,393 B2* | 10/2012 | Mathews | ................ | A61H 5/00 361/679.21 |
| 9,104,375 B2* | 8/2015 | Lee | ................ | G06F 1/1637 |
| 9,256,249 B2* | 2/2016 | Truong | ................ | G06F 1/1601 |
| 9,261,901 B2* | 2/2016 | Truong | ................ | G06F 1/1601 |
| 9,464,752 B2* | 10/2016 | Truong | ................ | F16M 11/10 |
| 9,946,309 B2* | 4/2018 | Hewett | ................ | H05K 5/0226 |
| 2001/0022719 A1* | 9/2001 | Armitage | ................ | G06F 1/16 361/679.17 |
| 2001/0046114 A1* | 11/2001 | Suzuki | ................ | G06F 1/1616 361/679.21 |
| 2002/0145847 A1* | 10/2002 | Crosby | ................ | F16M 11/10 361/679.02 |
| 2003/0021086 A1* | 1/2003 | Landry | ................ | G06F 1/1616 361/679.27 |
| 2004/0057197 A1* | 3/2004 | Hill | ................ | G06F 1/1601 361/679.06 |
| 2004/0114319 A1* | 6/2004 | Hill | ................ | G06F 1/1601 361/679.28 |
| 2010/0177473 A1* | 7/2010 | Wu | ................ | F16M 11/10 361/679.21 |
| 2014/0085797 A1* | 3/2014 | Cho | ................ | G06F 1/1601 361/679.21 |

* cited by examiner

*Primary Examiner* — Lisa Lea-Edmonds
(74) *Attorney, Agent, or Firm* — Brian J. Pangrle

(57) ABSTRACT

A computing device can include a processor; memory accessible by the processor; a base that includes a first platform at a first height and a second platform at a second height that differs from the first height; an arm operatively coupled to the base; and a display operatively coupled to the processor and operatively coupled to the arm.

20 Claims, 14 Drawing Sheets

TIERED COMPUTING DEVICE

TECHNICAL FIELD

Subject matter disclosed herein generally relates to computing devices.

BACKGROUND

A computing device can include a display and a base where the display is operatively coupled to the base via an arm.

SUMMARY

A computing device can include a processor; memory accessible by the processor; a base that includes a first platform at a first height and a second platform at a second height that differs from the first height; an arm operatively coupled to the base; and a display operatively coupled to the processor and operatively coupled to the arm. A computing device can include a processor; memory accessible by the processor; a base; a display operatively coupled to the processor, where the display includes a first side and an opposing second side that define a widthwise dimension; and an arm operatively coupled to the base and operatively coupled to the display, where the arm is off-centered with respect to the widthwise dimension of the display. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
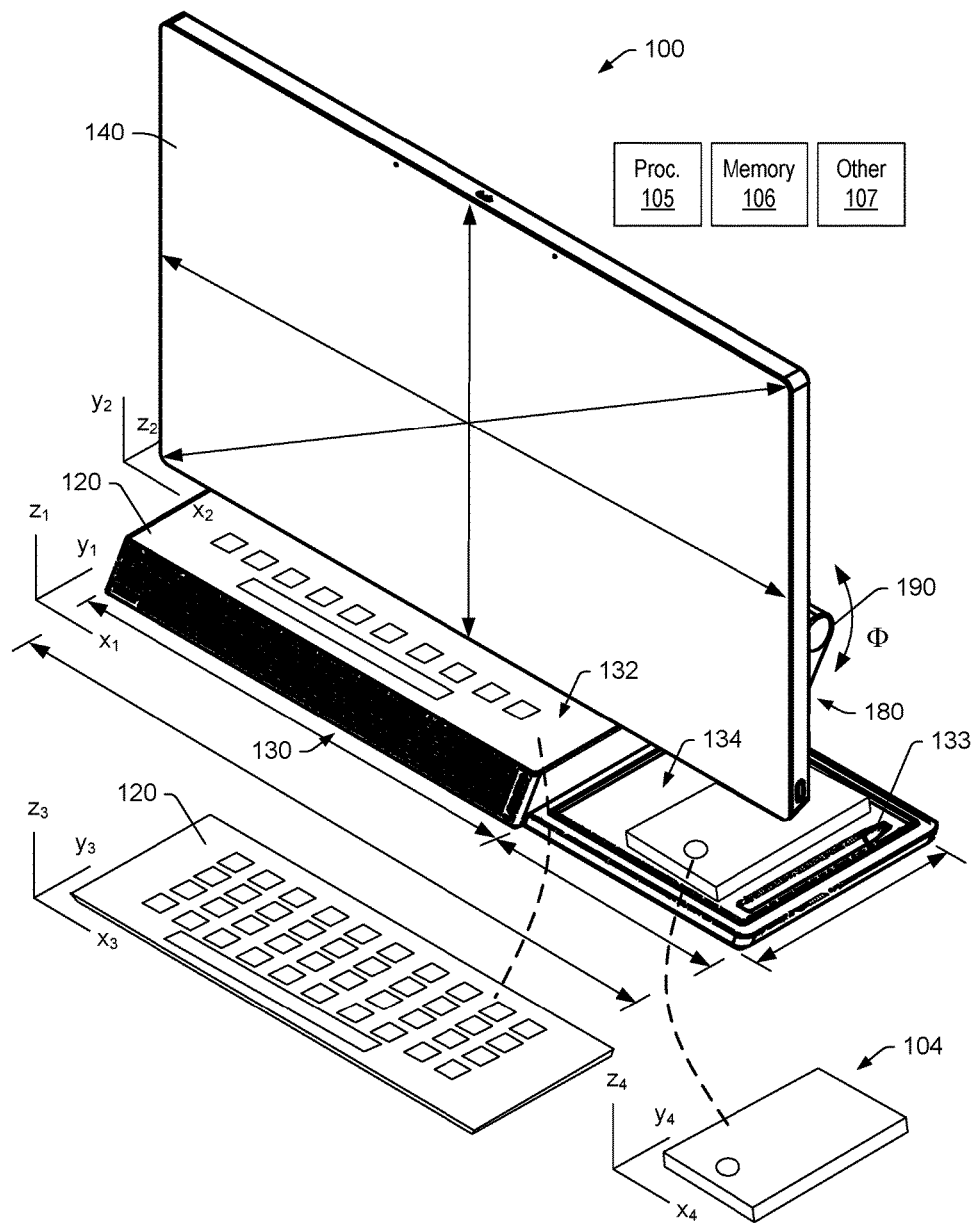
FIG. 1 is a perspective view of an example of a computing device.

FIG. 1 shows an example of a computing device 100 that includes a keyboard 120, a base 130 that includes a first platform 132 and a second platform 134, a display 140, an arm 180 that extends from the base 130 and an arm mount 190 that couples the arm 180 to the display 140. The base 130 and the display 140 can be defined with respect to one or more coordinate systems such as, for example, one or more Cartesian coordinate systems (see, e.g., $z_1$ and $x_2$, $y_2$, $z_2$). The keyboard 120 and an another computing device (e.g., or a peripheral) 104 can be defined with respect to one or more coordinate systems such as, for example, one or more Cartesian coordinate systems (see, e.g., $x_3$, $y_3$, $z_3$ and $x_4$, $y_4$, $z_4$).

In the example of FIG. 1, the base 130 is tiered in that the first platform 132 is at a different height than the second platform 134, for example, as defined with respect to $z_1$.

As an example, the first platform 132 can be sized to accommodate the keyboard 120 as a QUERTY keyboard (e.g., with at least 10 keys such as 10 number keys 1, 2, 3, 4, 5, 6, 7, 8, 9 and 0 in a row). As an example, the second platform 134 may be sized differently, for example, to accommodate a smart phone such as an PHONE® smart phone, a MOTO® smart phone, a SAMSUNG® smart phone, etc.

As an example, the platform 134 may include a dock 133 for a stylus. In such an example, the display 140 can be a digitizer display that can operate in conjunction with a stylus, for example, for drawing on the display 140. In such an example, the computing device 100 may be a digital content creator (DCC) device.

As an example, the computing device 100 can be an "All-In-One" (AIO) device that includes the base 130 and the display 140 along with one or more processors 105, memory 106 accessible to at least one of the one or more processors 105 and one or more other types of circuitry 107.

As an example, the computing device 100 can include the display 140 with an area (e.g., $x_2$ by $y_2$) that is larger than a footprint of the base 130 (e.g., $x_1$ by $y_1$). In such an example, an area of the first platform 132 plus an area of the second platform 134 can be smaller than the area of the display 140 and, for example, approximately equal to the footprint of the base 130.

As an example, the platform 132 and/or the platform 134 may be functional in that features can interact with a component placed on the platform 132 and/or the platform 134. For example, consider a platform including wireless charging circuitry such that a wireless keyboard and/or a wireless peripheral, smart phone, etc. can be place on the platform and have one or more batteries thereof charged via such wireless charging circuitry. As an example, a wireless peripheral may be a stylus.

In the example of FIG. 1, the base 130 can be asymmetric in that the platforms 132 and 134 are asymmetric and/or in that the arm 180 may mount to the arm mount 190 in a manner that is asymmetric with respect to the display 140. For example, along the dimension $x_2$, the arm 180 may be off-centered. Such a configuration may be referred to as being cantilevered. Cantilever construction allows for overhanging structure, without bracing. For example, a portion of the display to the left of the arm 180 in FIG. 1 can be overhanging as it extends a distance from the arm 180 (e.g., at the arm mount 190) that is greater than a distance to the right of the arm 180.

Figure 2:
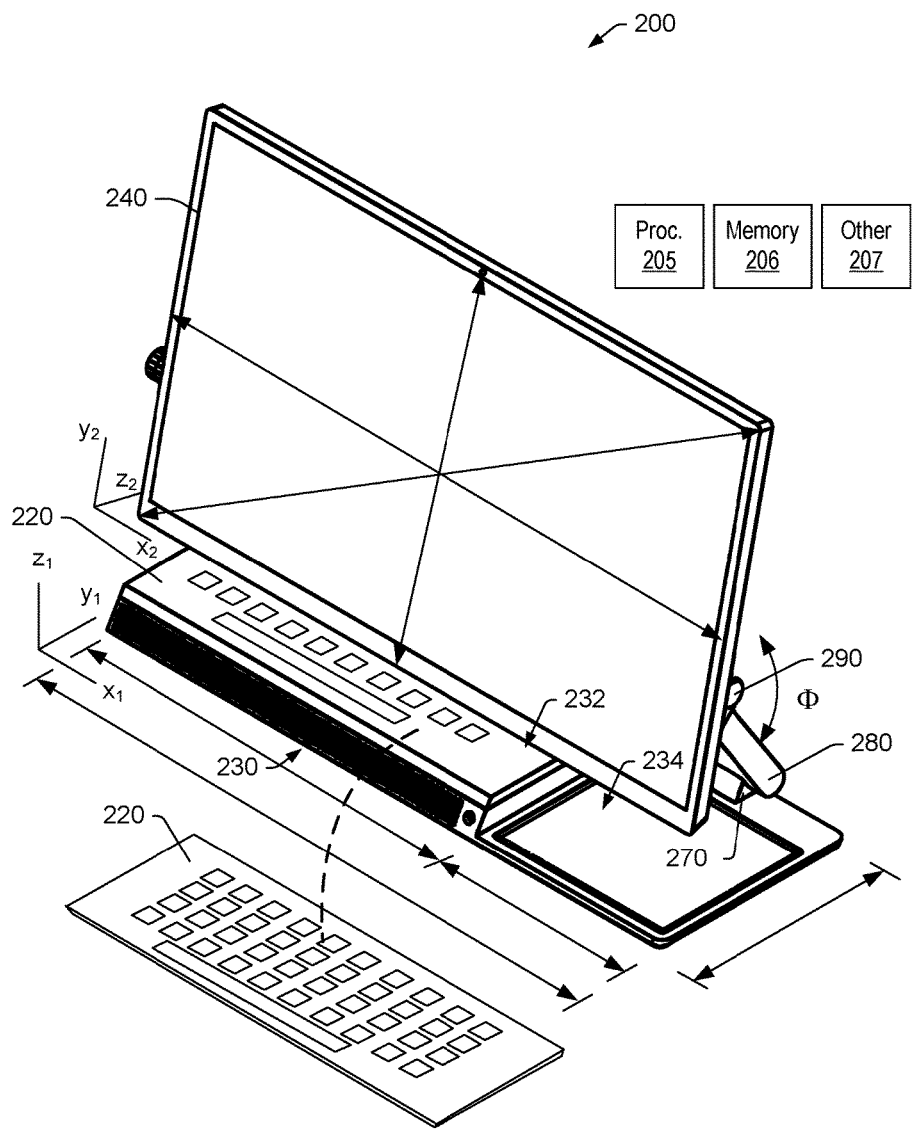
FIG. 2 is a perspective view of an example of a computing device.

FIG. 2 shows an example of a computing device 200 with a cantilevered display 240 with respect to an arm 280 that is coupled to a base 230 via a lower arm mount 270. As shown in FIG. 2, the computing device 200 can include a keyboard 220, the base 230 that includes a first platform 232 and a second platform 234, the display 240, the arm 280 that extends from the base 230 and an upper arm mount 290 that couples the arm 280 to the display 240. The base 230 and the display 240 can be defined with respect to one or more coordinate systems such as, for example, one or more Cartesian coordinate systems (see, e.g., $z_1$ and $x_2$, $y_2$, $z_2$). The keyboard 220 and one or more other computing device (e.g., or a peripheral or peripheral) can be defined with respect to one or more coordinate systems (see, e.g., $x_3$, $y_3$, $z_3$ and $x_4$, $y_4$, $z_4$ of FIG. 1).

In the example of FIG. 2, the base 230 is tiered in that the first platform 232 is at a different height that the second platform 234, for example, as defined with respect to $z_1$.

As an example, the first platform 232 can be sized to accommodate the keyboard 220 as a QUERTY keyboard (e.g., with at least 10 keys such as 10 number keys 1, 2, 3, 4, 5, 6, 7, 8, 9 and 0 in a row). As an example, the second platform 234 may be sized differently, for example, to accommodate a smart phone such as an PHONE® smart phone, a MOTO® smart phone, a SAMSUNG® smart phone, etc.

As an example, the platform 234 may include a dock for a stylus. In such an example, the display 240 can be a digitizer display that can operate in conjunction with a stylus, for example, for drawing on the display 240. In such an example, the computing device 200 may be a digital content creator (DCC) device.

As an example, the computing device 200 can be an "All-In-One" (AIO) device that includes the base 230 and the display 240 along with one or more processors 205, memory 206 accessible to at least one of the one or more processors 205 and one or more other types of circuitry 207.

As an example, the computing device 200 can include the display 240 with an area (e.g., $x_2$ by $y_2$) that is larger than a footprint of the base 230 (e.g., $x_1$ by $y_1$). In such an example, an area of the first platform 232 plus an area of the second platform 234 can be smaller than the area of the display 240 and, for example, approximately equal to the footprint of the base 230.

As an example, the platform 232 and/or the platform 234 may be functional in that features can interact with a component placed on the platform 232 and/or the platform 234. For example, consider a platform including wireless charging circuitry such that a wireless keyboard and/or a wireless peripheral, smart phone, etc. can be place on the platform and have one or more batteries thereof charged via such wireless charging circuitry. As an example, a wireless peripheral may be a stylus.

In the example of FIG. 2, the base 230 is asymmetric in that the platforms 232 and 234 are asymmetric and in that the arm 280 is mounted to the arm mount 290 in a manner that is asymmetric with respect to the display 240. For example, along the dimension $x_2$, the arm 280 is off-centered. Such a configuration may be referred to as being cantilevered. Cantilever construction allows for overhanging structure, without bracing. For example, a portion of the display to the left of the arm 280 in FIG. 2 is overhanging as it extends a distance from the arm 280 (e.g., at the arm mount 290) that is greater than a distance to the right of the arm 280.

As shown in FIG. 1, the keyboard 120 may be movable and be in a docked state with respect to the base 130 and in an undocked state, for example, disposed in front of the base 130.

As shown in FIG. 2, the keyboard 220 may be movable and be in a docked state with respect to the base 230 and in an undocked state, for example, disposed in front of the base 230.

In the examples of FIG. 1 and FIG. 2, the memory 106 and the memory 206 may store instructions executable by the processor 105 and the processor 205, respectively. For example, operating system instructions may be stored in the memory 106 and the memory 206 and executable by the processor 105 and the processor 205, respectively, to establish an operating system environment that can be implemented to execute applications, control circuitry, receive information, transmit information, etc. As an example, the processor 105 and the processor 205 may be included in the base 130 and the base 230 or the display 140 and the display 240 and the memory 106 may be included in the base 130 or the display 140 and the memory 206 may be included in the base 230 or the display 240.

In the example of FIG. 2, the computing device 200 includes an input tool 209. The input tool 209 includes mechanical features and electronic features where mechanical parts are operatively coupled to electronic circuitry such that the input tool 209 can issue signals that instruct the computing device 200. For example, the input tool 209 can issue signals that instruct the processor 205 of the computing device 200 (e.g., directly and/or indirectly). As an example, the computing device 100 can include such an input tool. As an example, the input tool 209 may include one or more wheels and, for example, a button (e.g., an end button).

As shown in FIG. 1, the computing device 100 can include the processor 105; the memory 106 accessible by the processor 105; the base 130 that includes the first platform 132 at a first height and the second platform 134 at a second height that differs from the first height; the arm 180 operatively coupled to the base 130; and the display 140 operatively coupled to the processor 105 and operatively coupled to the arm 180.

As shown in FIG. 2, the computing device 200 can include the processor 205; the memory 206 accessible by the processor 205; the base 230 that includes the first platform 232 at a first height and the second platform 234 at a second height that differs from the first height; the arm 280 operatively coupled to the base 230; and the display 240 operatively coupled to the processor 205 and operatively coupled to the arm 180.

As shown in FIG. 2, the computing device 200 can include the processor 205; the memory 206 accessible by the processor 205; the base 230; the display 240 operatively coupled to the processor 205, where the display 240 includes a first side and an opposing second side that define a widthwise dimension (e.g., as measured with respect to $x_2$); and the arm 280 operatively coupled to the base 230 and operatively coupled to the display 240, where the arm 280 is off-centered with respect to the widthwise dimension of the display 240. As shown in FIG. 2, the display 240 includes a dimension that is orthogonal to the widthwise dimension (see, e.g., line as may be measured with respect to $y_2$). In the example of FIG. 2, a widthwise line appears to indicate a widthwise dimension of the display 240 where another line, orthogonal to the widthwise line, appears that bisects the widthwise line to indicate a center of the display 240. In such an example, the display 240 can be defined by quadrants such as a lower left, an upper left, an upper right and a lower right. In the example of FIG. 2, the arm 280 is operatively coupled to the display 240 in the lower right quadrant, which may be defined, for example, with respect to the coordinate system illustrated (e.g., $x_2$, $y_2$). As an example, an arm can be off-centered with respect to a display and mounted to the display (e.g., via an arm mount) at one or more left side quadrants or at one or more right side quadrants. In the example of FIG. 2, by mounting the arm 280 in a lower quadrant (e.g., lower right or lower left), rotation of the display 240 is about a rotational axis that is shown to coincide with the lower half of the display 240 (e.g., below the horizontal double headed arrow). As an example, the display 240 may be defined by one or more diagonal lines, which can cross at a center and that can define quadrants, etc. As shown in FIG. 2, quadrants of the display 240 can meet at a center point of the display 240, which is centered with respect to two dimensions (e.g., $x_2$ and $y_2$). As an example, the base 230 may be defined with respect to various dimensions, halves, quadrants, etc. For example, along $x_1$, the base 230 can include a first half (e.g., a left half) and a second half (e.g., a right half). As shown, the lower arm mount 270 couples to the second half of the base 230 and the second platform 234 is of the second half of the base 230 while the first platform 232 spans a distance that extends into the first half and the second half of the base 230 where the distance includes a center line of the base 230 that defines the two halves.

Figure 3:
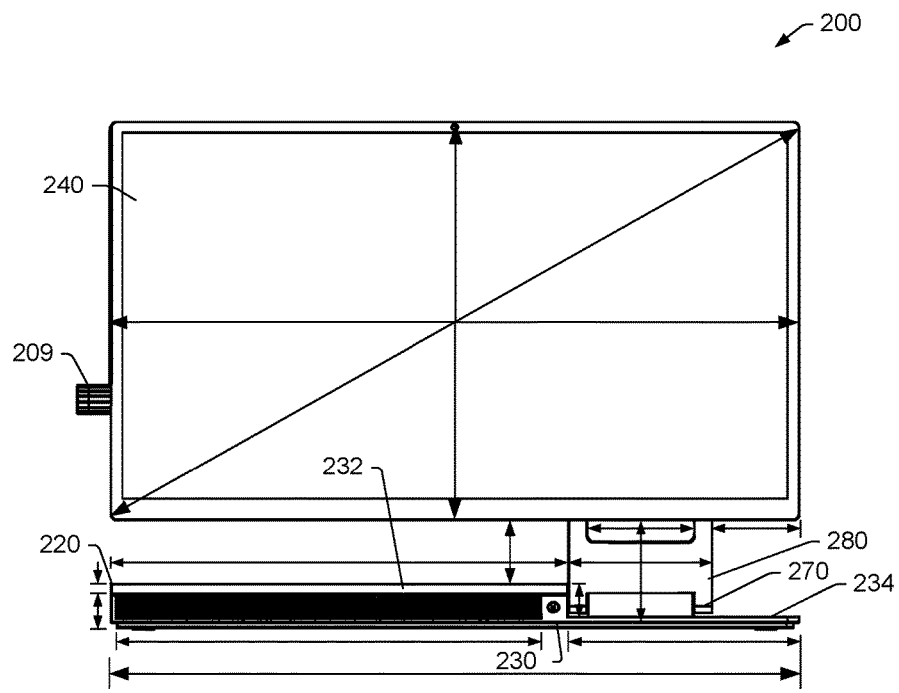
FIG. 3 is a front view of the computing device of FIG. 2.

In FIG. 3, various dimensions are illustrated with respect to the lower arm mount 270 and the arm 280 of the computing device 200. As shown in FIG. 3, an area of the display 240 is greater to the left of the arm 280 than an area to the right of the arm 280. While the arm 280 is offset from center to the right, as an example, a computing device 200 can have an arm that is offset from center to the left.

Figure 4A:
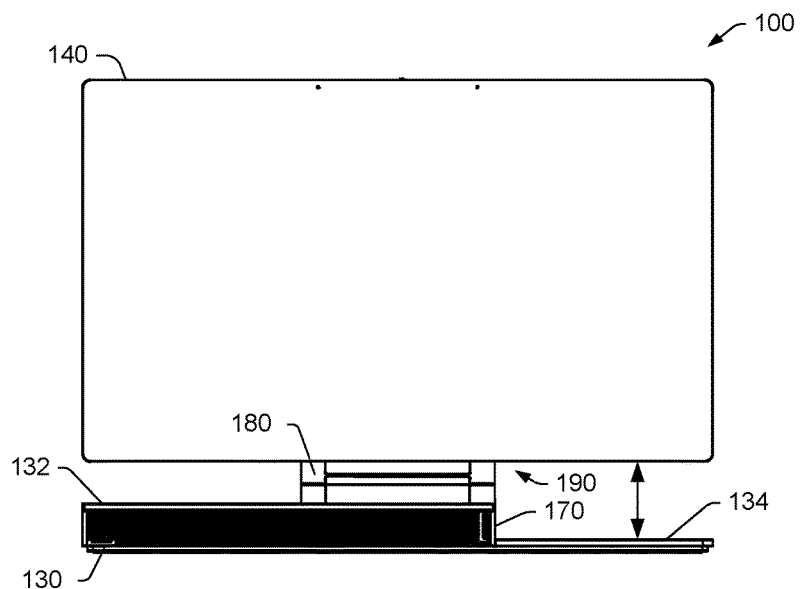
FIGS. 4A and 4B are front views of the computing device of FIG. 1.
Figure 4B:
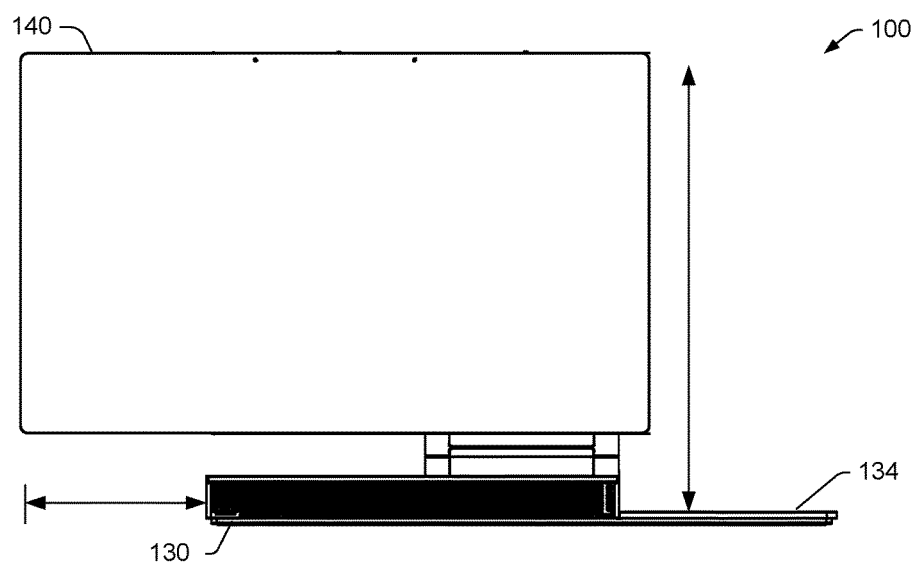

FIG. 4A and FIG. 4B show an example of the computing device 100 of FIG. 1 with a translatable display 140 where the display 140 can be moved from a first state that is a centered state to a second state that is an off-centered state. As shown, the in the off-centered state, at one side, the display 140 includes a portion that extends beyond a side of the base 130 while, at an opposing side, the display 140 is inset from an end of the base 130 (e.g., the right end). In such an example, translation of the display 140 may allow for more space above the platform 134. In comparison to the example of FIG. 3, for the computing device 200, the display 240 is substantially centered with respect to the base 230 (e.g., opposing ends of the base 230 are substantially even with opposing sides of the display 240).

Figure 5:
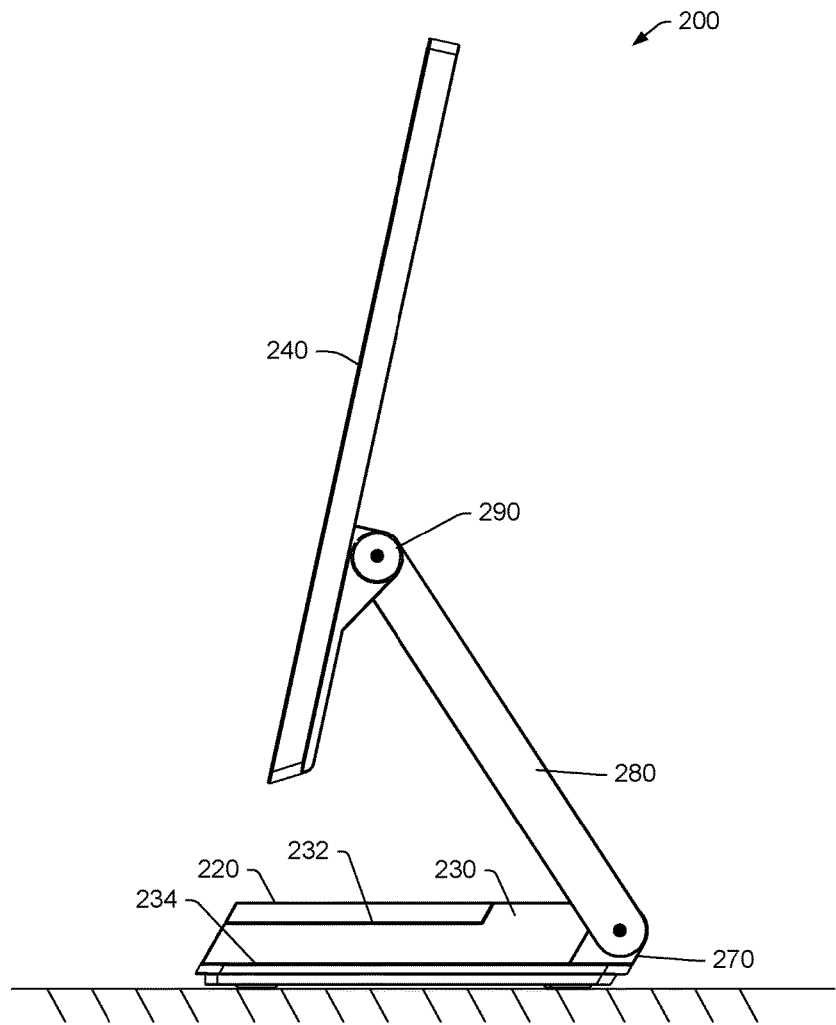
FIG. 5 is a side view of the computing device of FIG. 2.

FIG. 5 shows a side view of the computing device 200 where the keyboard 220 is docked on the platform 232. As shown, the lower arm mount 270 includes an axis (see black circle) with the arm 280 that is at a level that is between a height of the platform 232 and a height of the platform 234. The axis can be a rotational axis where the arm 280 and the lower arm mount 270 may be operatively coupled via an axle or other rotational mechanism. The upper arm mount 290 can also include a rotational axis about which the display 240 may rotate with respect to the arm 280 via the upper arm mount 290.

Figure 6A:
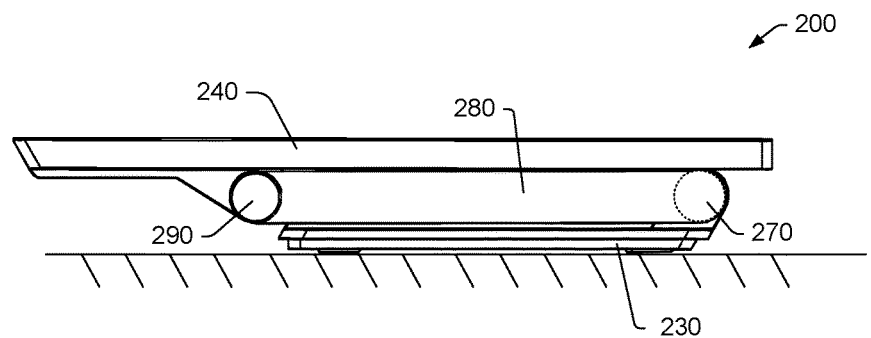
FIGS. 6A and 6B are side views of the computing device of FIG. 2.

FIG. 6A shows the computing device 200 where the display 240 is in a horizontal orientation, for example, substantially parallel to a surface such as that of a table or a desk upon which the base 230 is seated. As shown in FIG. 6A, the arm 280 is in a folded position that is between an upper surface of the platform 234 and a back side surface of the display 240. Such an orientation can be achieved via the platform 234 being lower than the axis of the lower arm mount 270. In such an arrangement of features, the display 240 fits compactly where the base 230, the display 240 and the arm 280 can be substantially parallel to each other.

Figure 6B:
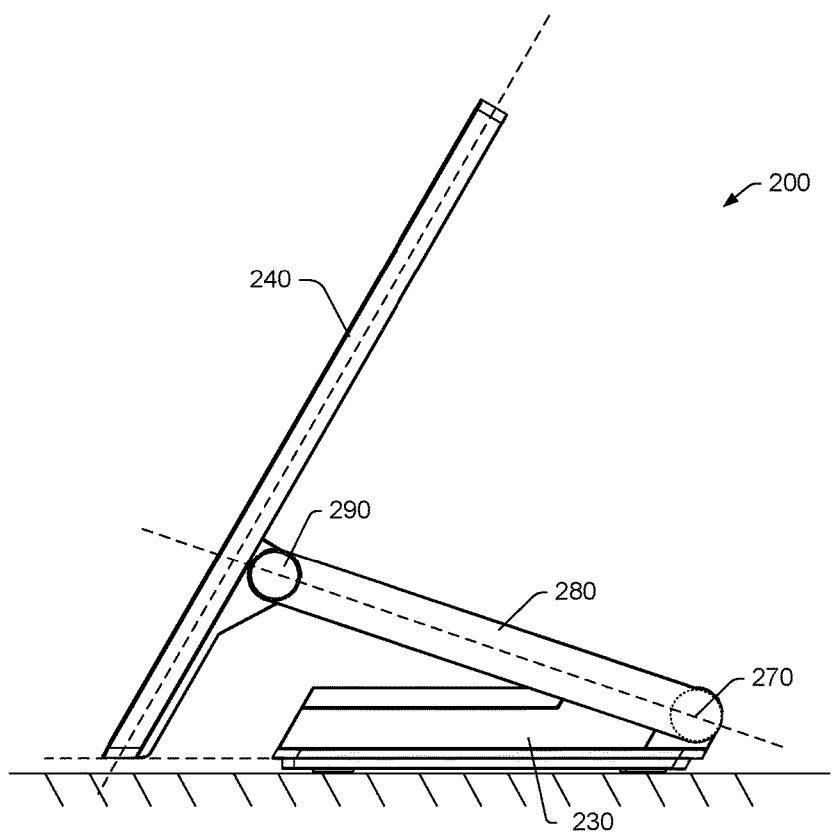

In FIG. 6B, the computing device 200 is shown in another orientation of the display 240 and the arm 280 where the arm is lifted above the platform 234 at an angle, which may be defined by axes of the arm 280 where it couples to the lower arm mount 270 and the upper arm mount 290 and a horizontal surface upon which the base 230 rests. Or, for example, the angle may be defined by a planar surface of the platform 234 (e.g., an upper surface of the platform 234) and the arm 280. As an example, the display 240 can include a lower edge that may be lowered from the orientation shown in FIG. 6B such that the lower edge contacts a surface upon which the base 230 rests. In such an example, the display 240 may be more stable as it is supported at multiple points (e.g., at the upper arm mount 290 and at the lower edge).

Figure 7:
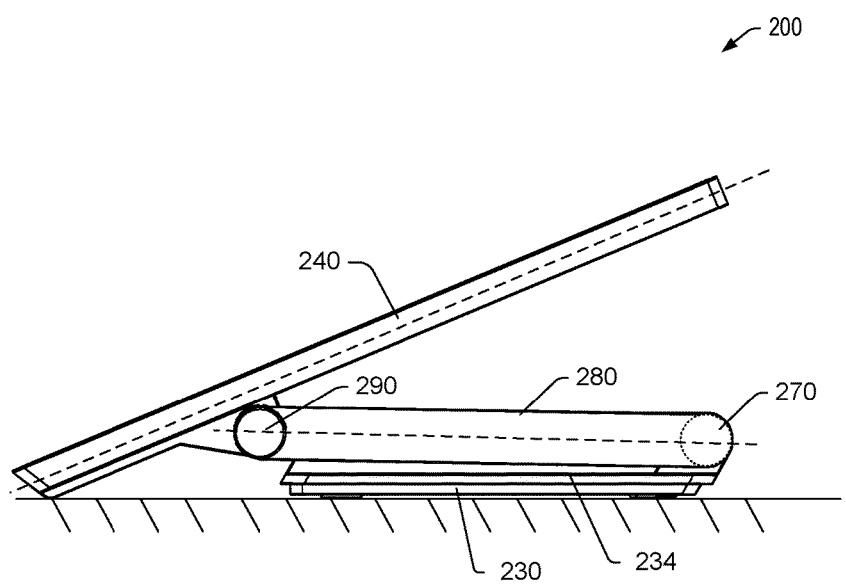
FIG. 7 is a side view of the computing device of FIG. 2.

FIG. 7 shows the computing device 200 in another orientation, which may be referred to as a drawing orientation as the display 240 is oriented ergonomically for drawing using a finger, a stylus, etc. In the orientation of FIG. 7, the arm 280 may be at a slight angle and the lower edge of the display 240 may be in contact with a surface upon which the base 230 is seated (e.g., a table, a desk, etc.). In such an orientation, a user may place a portion of a hand in contact with the display 240 while holding a stylus to draw on the display 240. Where the display 240 is in contact with the surface (e.g., support surface) upon which the base 230 rests, the display 240 may be more stable than if it were not in contact and weight of a hand was born by the arm 280 and its couplings at the upper arm mount 290 and the lower arm mount 270.

As an example, the arm 280 may be leveled and in contact with an upper surface of the platform 234, which can provide additional stability for the display 240 while the display 240 is still in an ergonomic drawing angle (e.g., for digital content creation, editing, etc.).

Figure 8:
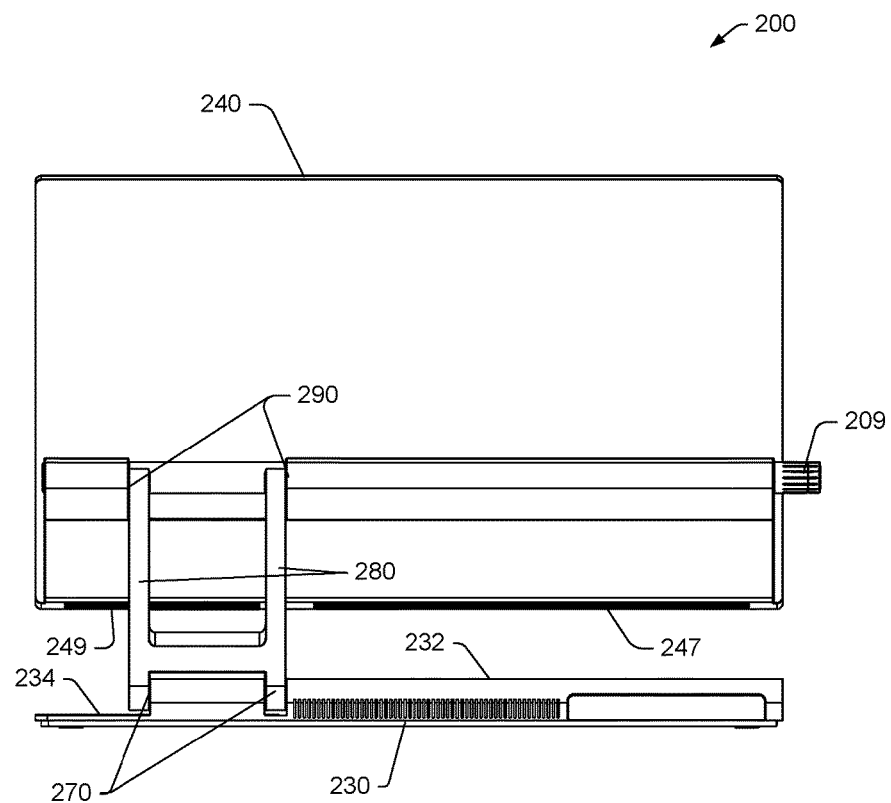
FIG. 8 is a back view of the computing device of FIG. 2.

FIG. 8 shows a back view of the computing device 200 where the lower arm mount 270 is shown to be operatively coupled to two members of the arm 280 and where the upper arm mount 290 is also operatively coupled to the two members of the arm 280. As mentioned, the arm 280 may be off-centered with respect to the display 240. As shown in FIG. 8, the arm 280 is off-centered with respect to the base 230. In particular, the arm 280 is offset to one side of the platform 232 such that it can be over at least a portion of the platform 234. As mentioned, such an arrangement can allow for the arm 280 to fold in a manner that is more compact than if the arm 280 were positioned over the higher platform 232.

The example of FIG. 8 also shows the input tool 209 as being substantially aligned with the axis of rotation of the arm 280 at the upper arm mount 290. In such an example, the display 240 rotates about the axis such that a longitudinal axis of the input tool 209 may remain in a constant position as the display 240 is rotated about the axis at the arm 280 and the upper arm mount 290.

As an example, an arm may include one or more members. As an example, a member can be offset from a center of a display such that the display is cantilevered and/or a member can be offset form a center of a base. As shown in FIG. 8, the arm 280 is offset from a center of the display 240 and offset from a center of the base 230.

FIG. 8 also shows one or more lights (e.g., one or more lamps) 247 and 249, which may be controlled via one or more mechanisms such as touch, voice command, graphical user interface (GUI), input tool 209 (e.g., consider an end button push, etc.). As shown, the light 247 may be positioned to illuminate the platform 232 (e.g., or component disposed thereon) and the light 249 may be positioned to illuminate the platform 234 (e.g., or component disposed thereon).

Figure 9A:
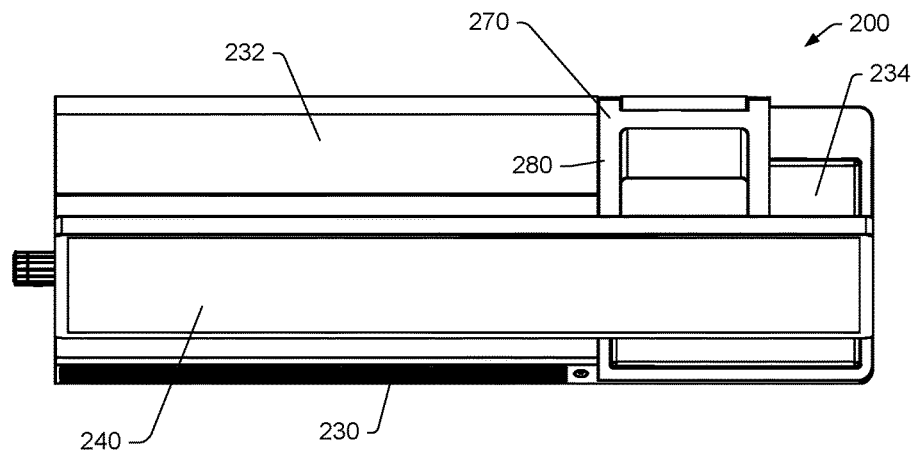
FIGS. 9A and 9B are top views of the computing device of FIG. 2.

FIG. 9A shows a top view of the computing device 200 where the display 240 is near vertical, as it may be positioned in a vertical orientation with respect to a surface upon which the base 230 is seated. In a vertical orientation, the base 230 may be defined by a plane and the display 240 may be defined by a plane where the planes are orthogonal to each other.

Figure 9B:
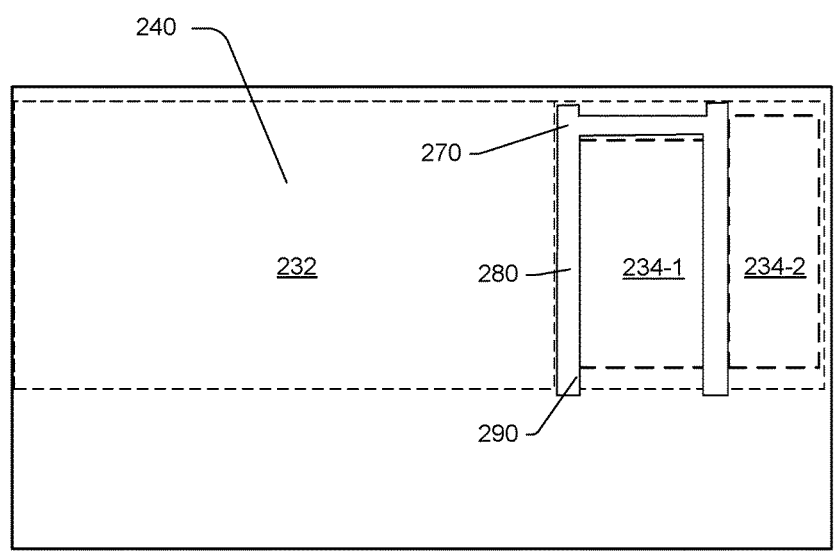

FIG. 9B shows a top view of the computing device 200 with the display 240 in a horizontal orientation. In the example of FIG. 9B, the arm 280 is shown in solid lines for clarity though it is not visible as it is covered by the display 240 while features of the base 230 are shown in dashed lines. Specifically, the platform 232 is shown approximately in dashed lines as are two portions of the platform 234, 234-1 and 234-2. The platform 234 is split into portions by the arm 280 where the portion 234-1 may be a compartment such as a storage compartment. For example, a smart phone or other device may be disposed in the compartment where the compartment is bound by an upper surface of the portion of the platform 234-1, a back side of the display 240, by surfaces of the members of the arm 280 and by the lower arm mount 270 and the upper arm mount 290. As to the portion 234-2, it may be open to the side and, for example, accessible by a finger or fingers of a hand. As an example, a stylus dock may be included in the portion 234-1 and/or in the portion 234-2 of the platform 234. In the portion 234-2, a stylus in the stylus dock may be accessible by a finger or fingers while the computing device is in the horizontal orientation (e.g., where the arm 280 is folded).

FIG. 9B also allows for a comparison of area of the display 240 to area of the base 230 and/or areas of the platform 232 and the platform 234.

As mentioned, the platforms 232 and 234 can be tiered where one is at a different height than the other. In such an example, a shoulder or step can exist as a transition feature between the two platforms 232 and 234. In the example of FIG. 9A and in the example of FIG. 9B, the arm 280 is shown as being adjacent to the shoulder or step (e.g., a transition feature).

As an example, the area of the platform 232 may be sufficient to accommodate a keyboard and the arm 280 may be positioned adjacent to a step that transitions from the platform 232 to the platform 234. In such an example, the available area and/or compartmentalization of the platform 234 may be determined or defined at least in part by the arm 280.

As an example, where a keyboard is positioned on the platform 232, in the horizontal orientation with the arm 280 folded, the keyboard may be between an upper surface of the platform 232 and a back side of the display 240. As an example, the platform 232 can include a back wall that rises up from the platform 232 and the upper arm mount 290 may include an extension or support that extends across a back side of the display 240. In the folded, horizontal orientation, a keyboard disposed on the platform 232 may be bound at the back side by a wall and bound at the front side by the upper arm mount 290 (e.g., a support or extension thereof). As an example, an extension or support of an upper arm mount 290 may be a cantilever support in that it acts to support a cantilevered portion of the display 240 (e.g., the portion of the display 240 that extends to one side of the arm 280 where that portion is greater than the portion of the display 240 that extends to an opposing side of the arm 280).

Figure 10:
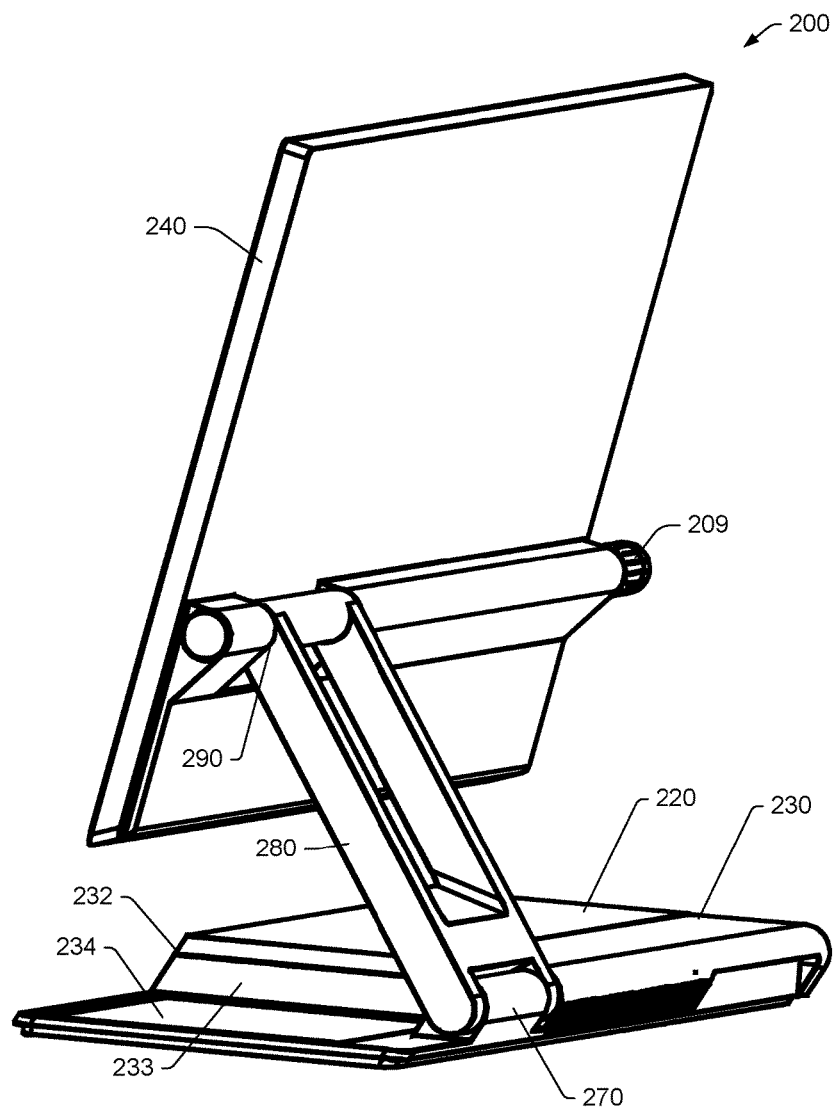
FIG. 10 is a perspective view of the computing device of FIG. 2.

FIG. 10 shows a perspective view of the computing device 200 where a component such as the keyboard 220 is positioned on the platform 232 and where a shoulder or step 233 can be seen between the platform 232 and the platform 234. As mentioned, the arm 280 may be adjacent to the shoulder or step 233 (e.g., side wall, etc.).

Figure 11:
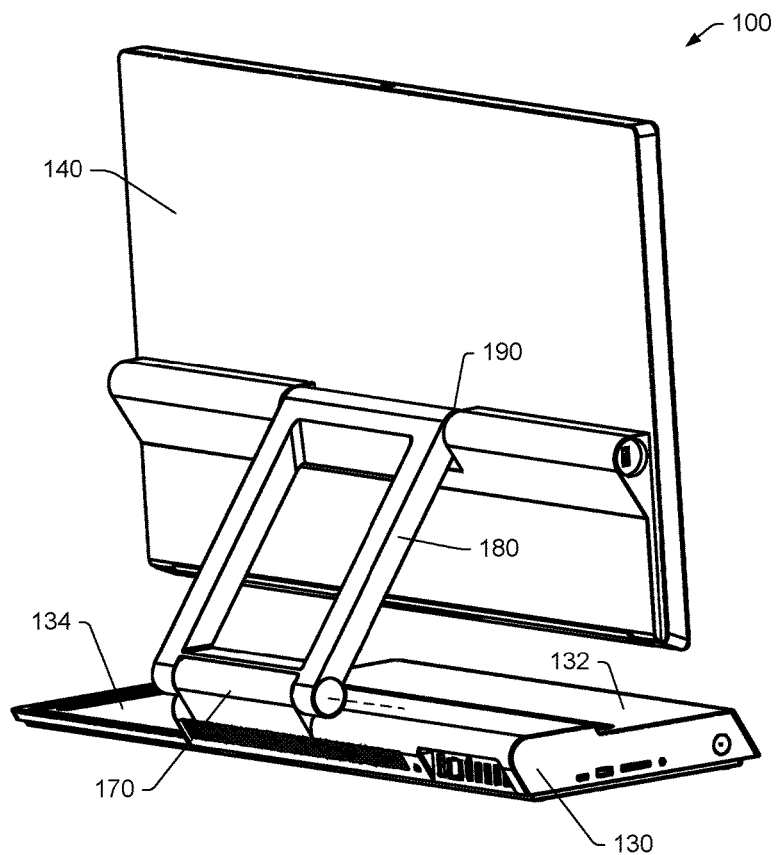
FIG. 11 is a perspective view of the computing device of FIG. 1.

FIG. 11 shows a perspective view of the computing device 100. As shown, an axis of the lower arm mount 170 is at a height that is not between the height of the platform 132 and the height of the platform 134. Rather, the axis is shown to be higher than the height of the platform 134. In such a configuration, the arm 180 can fold across the platform 132, for example, to be even with a keyboard set on the platform 132 (not shown in FIG. 11, see, e.g., FIG. 1). The configuration of the computing device 100 as shown in FIG. 11 can transition to a folded, horizontal orientation where it may not be as compact as the folded, horizontal orientation of the computing device 200 due to the height of the axis of rotation where the arm 180 couples to the lower arm mount 170.

A comparison between the computing device 100 of FIG. 11 and the computing device 200 of FIG. 10 can provide for some differences as to symmetry and asymmetry with respect to an arm and a display. In the example of FIG. 11, the computing device 100 includes the arm 180 centered with respect to the display 140 while in the example of FIG. 10, the computing device 200 includes the arm 280 off-centered with respect to the display 240.

The example computing device 200 of FIG. 10 and the example computing device 100 of FIG. 11 include platforms where the platforms are tiered. As an example, the computing device 100 of FIG. 11 may include a single platform rather than two platforms that are tiered. For example, the platform 132 may extend from one side the other side of the base 230. Such an arrangement is possible given the elevated position of the axis of the lower arm mount 170 with respect to the arm 180, which can fold the arm above the platform 132 (e.g., which may include a keyboard set thereon).

Figure 12:
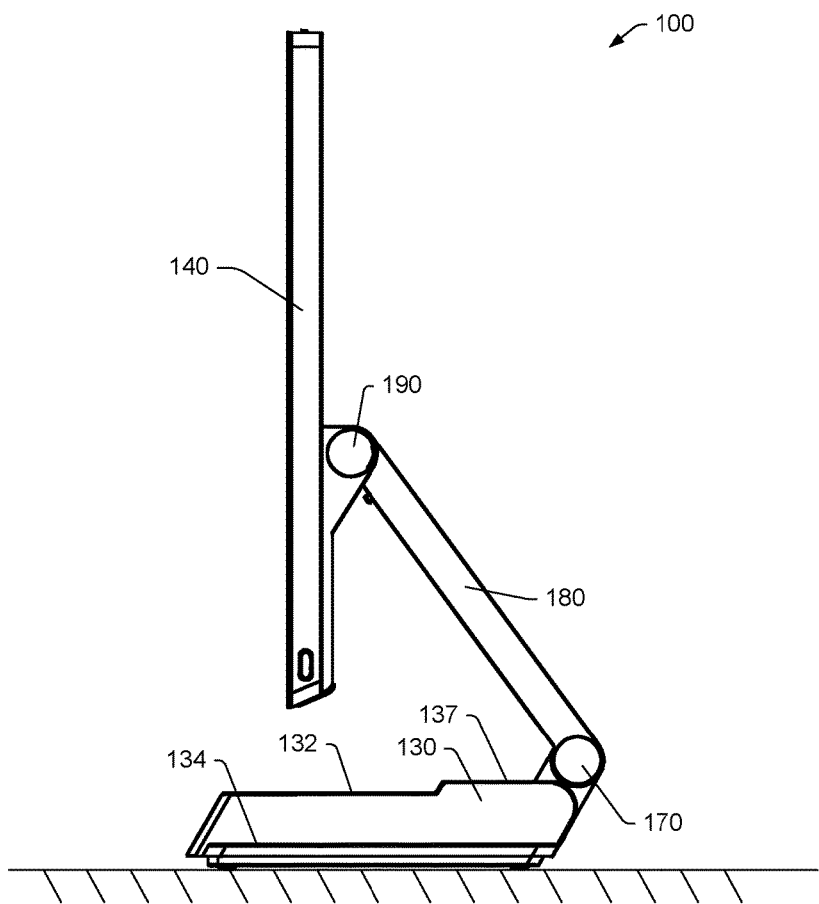
FIG. 12 is a side view of the computing device of FIG. 1.

FIG. 12 shows the computing device 100 with the display 140 in a vertical orientation (e.g., 90 degrees to the surface upon which the base 130 rests). In the example of FIG. 12, the platform 132 is elevated with respect to the platform 132 and the axis of the lower arm mount 170 is above the level of the platform 132. As shown in FIG. 12, the platform 132 may extend from front to a depth that is less than that of a back side of the base 130. In such an example, an upper surface 137 of the base 130 may provide support for the arm 180 when the arm 180 is folded to be substantially parallel to the platform 132. As an example, the upper surface 137 may be at a height (e.g., z) that is greater than a height of an upper surface of a keyboard disposed on the platform 132. In such an example, the arm 180 may cover the keyboard but not contact it in a manner where force may damage the keyboard. For example, the upper surface 137 may limit the folded position of the arm 180 such that additional force applied to the arm 180 is born by the upper surface 137 rather than by a keyboard disposed on the platform 132.

Figure 13A:
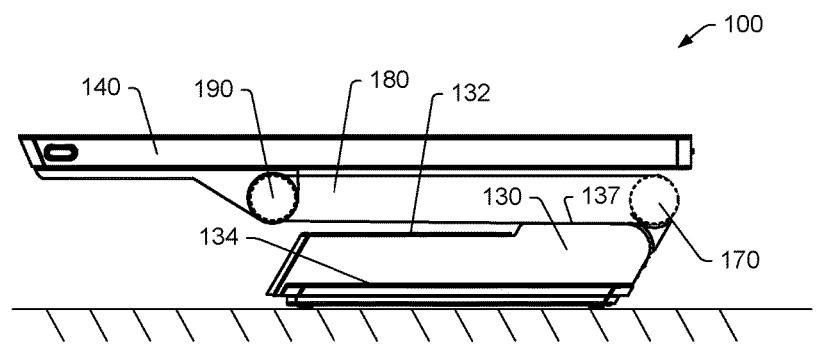
FIGS. 13A and 13B are side views of the computing device of FIG. 1.

FIG. 13A shows a folded, horizontal orientation of the display 140 of the computing device 100 where the arm 180 can be in contact with the upper surface 137 such that a gap exists between an upper surface of the platform 132 and a surface of the arm 180. As shown, the lower arm mount 170 is at a level that is above the upper surface 137 of the base 130.

Figure 13B:
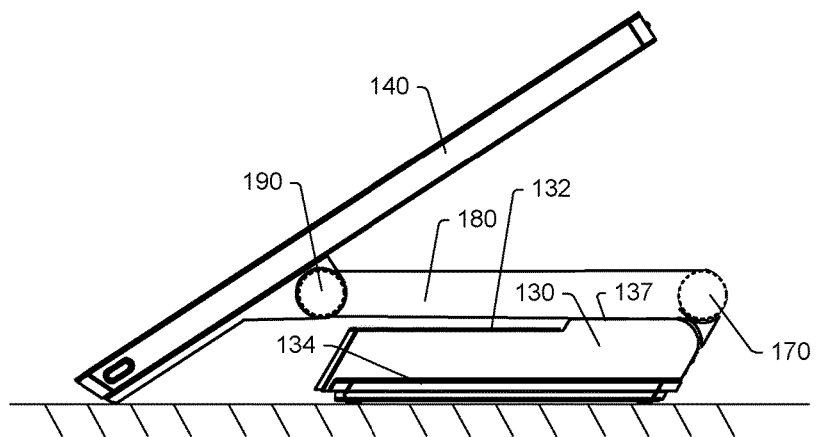

FIG. 13B shows the computing device 100 with the display 140 in a drawing orientation where the arm 180 is folded, for example, as in FIG. 13A. As an example, a transition can be made from the orientation of FIG. 13A to the orientation of FIG. 13B via rotation of the display 140 about an axis of rotation between the display 140 and the upper arm mount 190. In such an example, the arm 180 may be stabilized by being in contact with the upper surface 137. As an example, a lower edge of the display 140 may be in contact with a surface upon which the base 130 is seated such that the display 140 may be further stabilized.

As an example, a comparison may be made between the computing device 200 as oriented in FIG. 7 and the computing device 100 as oriented in FIG. 13B; noting that, in FIG. 7, the arm 280 may be positioned at a lesser angle (e.g., more folded) such that it may contact an upper surface of the platform 234. In comparing the orientations, the orientation of FIG. 7 is more compact heightwise as the axis of rotation of the lower arm mount 270 can be lower than the axis of rotation of the lower arm mount 170. Further, the axis of rotation of the upper arm mount 290 can be lower than the axis of rotation of the upper arm mount 190. In such an example, where an input tool such as the input tool 209 is provided (e.g., operatively coupled to a side of the display 140 or the display 240), a hand that extends from a forearm may be in a more ergonomic position for the computing device 200 than for the computing device 100. For example, for the computing device 200 in the orientation of FIG. 7, a user may readily manipulate the input tool (e.g., on a right side and/or on a left side of the display 240), optionally without lifting a hand from a surface (e.g., a table or desk surface); whereas, for the computing device 100 in the orientation of FIG. 13B, the height of the input tool may be higher to an amount that causes a user to lift her hand to manipulate the input tool (e.g., rotate one or more wheels, etc.).

As an example, the computing device 100 and/or the computing device 200 may be AIO devices that provide for a cleaner desk environment. For example, a platform of a base that can store a keyboard can help maintain a cleaner desk, particularly where an AIO device includes a display area that is larger than a footprint of the base. As shown, such a device may include orientations (e.g., states) where the display is angled with a front edge (e.g., lower edge) in contact with a table or desk or slightly above. Such orientations may be drawing orientations where a user manipulates a stylus to edit, to create, etc. In such orientations, a keyboard may not be utilized or utilized infrequently such that it is more efficient to have the keyboard stored in a place that does not occupy additional workspace (e.g., desk space, table space). A platform or bay for a keyboard can provide a suitable place for keyboard storage, particularly where a computing device is a digital content creation device to be utilized with a stylus, a finger, etc., for drawing and/or content editing tasks.

As an example, a user may utilize one hand to manipulate a stylus to draw with respect to the display 140 or the display 240 (e.g., a digitizer display that includes digitization circuitry that operates in conjunction with a stylus, etc.) while the user may utilize another hand to manipulate the input tool 209 (e.g., where included as part of the display 140 or the display 240). In such an example, the user may utilize the input tool 209 while a forearm of the user is resting on a surface (e.g., a table or desk surface). Such an arrangement of features of the computing device 100 or the computing device 200 improves ergonomic operation. As an example, in a drawing orientation, a display may be at an angle that is in a range from approximately 15 degrees to approximately 35 degrees with respect to a table or desk surface.

As an example, one or more applications may be a digital content creator application (e.g., a DCC application). As an example, the input tool 209 may be a DCC input tool that can operatively interact with a DCC application (e.g., for menu options, etc.).

As an example, an axis of an arm and an upper arm mount that couples the arm to a display may be an axis in a lower half of the display (e.g., approximately ⅓ of the way up the display from a lower edge to an upper edge).

Referring again to FIG. 9B, as shown, where a display is horizontal or at a low angle, the display may occupy an increased area of a work surface (e.g., a desk, a table, etc.). As the angle of a display decreases, its effective footprint increases. As mentioned, for drawing tasks (e.g., digital content creation, editing, etc.), an angle of approximately 20 degrees for a display may be utilized, which can cause the display to occupy much of a user's work surface. In such an orientation, there can be little room (if any) to place components such as a keyboard, which may be desirable to have within an arm's length if needed.

Desktops can be cluttered and can be difficult to organize with limited space. Where a user has various peripherals, space may be further limited (e.g., wireless speaker, cell phone charger, mouse, phone, keyboard, etc.

As mentioned, a computing device can include a platform or platforms for storage, where one or more of the platforms may include one or more additional functional features (e.g., charging, ports, connectors, etc.).

As an example, in various orientations a keyboard positioned on a platform may be available for use. For example, consider the example orientation of FIG. 10 where a gap exists between a lower edge of the display 240 and an upper surface of the keyboard 220. In such an example, where a user desires entering a few words, a command, etc., a user may reach one or more fingers via the gap to access the keyboard 220. In an example orientation such as that of FIG. 6A or FIG. 6B, a user may lift the display 240 to access the keyboard 220. In such examples, the keyboard 220 may be in a position that is readily reached and, for a wireless keyboard, where it can remain operatively coupled to a charger that can charge one or more rechargeable batteries of the keyboard (e.g., for BLUETOOTH or other connectivity).

As an example, a platform of a base may be above a motherboard. For example, the platform 132 or the platform 232 may be at least in part above a motherboard that includes one or more processors.

As an example, a platform may be above a speaker or speakers. For example, consider various openings (e.g., a grill) in the examples of FIG. 1 and FIG. 2 which can be a speaker grill. In such an example, the speaker can face a user. As an example, such openings or a portion of the openings may be for airflow, for example, to cool one or more components disposed in a base.

As an example, the display 140 and/or the display 240 can include a light or lights (e.g., a lamp or lamps) at a lower edge. For example, an LED strip may be integrated into a lower edge of a display may be controllable via one or more features (e.g., hardware, software, etc.) to illuminate a portion of a surface such as a desk or table surface. As an example, depending on position of a display, a lamp or lamps may be oriented to illuminate at least a portion of a platform, which may include a keyboard disposed thereon. For example, where a user wishes to reach a finger into to hit a key or two, a lamp may illuminate the keyboard to make the user's task easier. For example, in the examples of FIG. 1 and FIG. 2, the display 140 and/or the display 240 can include a lamp that directs light toward the keyboard 120 or 220 as positioned on the platform 132 or 232, respectively. As an example, such a lamp may extend over the platform 134 or 234 or, for example, a different lamp may be provided such that each platform has a corresponding lamp.

As mentioned, a base can be asymmetrical and/or an arm can be asymmetrical with respect to a base and/or a display. An asymmetrical configuration may allow a full size keyboard to be integrated/stored in a manner that does not interfere with an arm of an AIO device (e.g., a structural stand that connects the display to the base (e.g., CPU unit, etc.) with a variable adjustment of tilting and height concurrently).

As an example, a computing device can include a platform for a keyboard (e.g., with keys 1 to 0) and can include an arm that may be offset to one side of the platform. As an example, a computing device can include an arm that can fold over a platform. As an example, a computing device can include an arm that can fold over a keyboard disposed on a platform.

As an example, a base can have a footprint that is wide and shallow (e.g., larger in x than in y). The width may be utilized effectively via one or more platforms for storage of one or more peripherals. As an example, a portion of a base can be sufficiently wide and deep to accommodate a keyboard (e.g., with at least 40 keys, etc.).

As mentioned, a wide base may accommodate features such as a sound bar (e.g., one or more speakers). As an example, a base can include one or more ports (e.g., USB, audio, HDMI, power, Ethernet, etc.).

As an example, a base can include adjacent to a keyboard platform, a flat surface for phone charging and/or a dock for pen/stylus storage.

As mentioned, when a user needs to use a keyboard for general typing, it may be readily removed from a stored position and placed in front of the user where a display may be lifted/angled up in a position that may not be an angled down position for drawing.

As an example, a computing device includes a processor; memory accessible by the processor; a base that includes a first platform at a first height and a second platform at a second height that differs from the first height; an arm operatively coupled to the base; and a display operatively coupled to the processor and operatively coupled to the arm. In such an example, the first platform can be or include a holder for a keyboard. In such an example, the keyboard can include a rechargeable battery and the base can include charging circuitry for charging the rechargeable battery in an orientation of the computing device where the keyboard is disposed on the first platform. In such an example, the charging circuitry can be or include wireless charging circuitry.

As an example, a base can include wireless communication circuitry and a keyboard can include wireless communication circuitry for transmission of information from the keyboard to the base.

As an example, a computing device can include a base with a first platform at a first height and a second platform at a second height where the first height is greater than the second height. As an example, a computing device may include a base that has a single platform that can be a holder for a keyboard. As an example, a computing device can include a base with at least one platform. As an example, a computing device can include a base with at least two platforms. As an example, a computing device can include a base that is tiered in that it includes a plurality of platforms, which may be at two or more heights. As an example, a base may include two platforms at the same height where the platforms are separated by another portion of the base (e.g., another platform, a step transition or transitions, etc.).

As an example, a first platform of a base can include a first area and a second platform of the base can include a second area where the first area is greater than the second area.

As an example, a display can include at least one lamp disposed on a lower portion of the display. Such a lamp may be actuated to illuminate a work space, which may include a keyboard. As an example, such a lamp may illuminate a keyboard disposed on a platform of a base that supports the display (e.g., via an arm).

As an example, a base of a computing device can include a first platform that includes wireless charging circuitry and a second platform includes wireless charging circuitry. In such an example, the base may charge a wireless keyboard via one platform and charge a smart phone via the other platform such that the base of the computing device can simultaneously charge batteries of two different devices (e.g., a keyboard and another device such as a smart phone, etc.).

As an example, a computing device can include a base with a first platform and a second platform where an arm operatively coupled to the base and a display can fold over the first platform.

As an example, a computing device can include a base with a first platform and a second platform where an arm operatively coupled to the base and a display can fold over the second platform.

As an example, an arm can include an axis of rotation with respect to a lower arm mount operatively coupled to a base of a computing device where the base includes a first platform and a second platform at different heights, being a first height and a second height where the first height is greater than the second height. In such an example, the axis of rotation can be at an axis height that is less than the first height. As an example, an arm can include an axis of rotation with respect to a lower arm mount where the axis of rotation is at an axis height that is equal to or greater than the first height.

As an example, a computing device can include a display that has a display area that is greater than an area of a footprint of a base where an arm operatively couples the display and the base such that the display can be supported by the base in various orientations. Such orientations can include orientations where the display is supported solely by the arm and may include one or more orientations where the display may be in contact with a surface upon which the base is seated (e.g., a desk, a table, etc.).

As an example, a computing device can include a processor; memory accessible by the processor; a base; a display operatively coupled to the processor, where the display includes a first side and an opposing second side that define a widthwise dimension; and an arm operatively coupled to the base and operatively coupled to the display, where the arm is off-centered with respect to the widthwise dimension of the display. In such an example, the arm can be off-centered toward the second side of the display. As an example, the first side may be a left hand side and the second side may be a right hand side with respect to a keyboard and/or a user that is positioned at least in part in front of the display for viewing the display.

As an example, a base can include a recessed platform (see, e.g., the platform 234) where, in a folded orientation of an arm, the arm folds over the recessed platform. In such an example, the base can include an elevated platform (see, e.g., the platform 232). As shown in the example of FIG. 2, the platforms 232 and 234 are tiered in that the platform 232 is elevated and in that the platform 234 is recessed. As an example, such platforms may be defined at least in part by their respective heights with respect to the coordinate axis $z_1$ (e.g., as associated with a base). As an example, a base can include a step transition between an elevated platform and a recessed platform. Such a step transition may define a side wall. As an example, a side wall may include one or more ports such as a USB port or other type of port. In such an example, a user may position a device on the recessed platform and connect the device to a port of the side wall. For example, consider a smart phone with a cable that includes a connector end that can be connected to one or more of the ports in the side wall. In such an example, the cable and the smart phone may be "off-the-desk" in that they reside on the platform of the computing device to help create a clean desk environment.

As an example, a display can include a two-dimensional display area that includes a widthwise dimension and a dimension orthogonal to the widthwise dimension (see, e.g., the dimensions $x_2$ and $y_2$ of the FIG. 2).

As an example, an arm operatively coupled to a base can include an opening where in a folded horizontal orientation of a display operatively coupled to the arm, the opening can define side walls of a chamber with respect to a platform. In such an example, the chamber can be a storage chamber. For example, consider a storage chamber that provides for storage and charging of a portable electronic device (e.g., a smart phone, etc.). As an example, a chamber may provide for communication of information, via a port and/or via wireless circuitry.

As an example, a computing device can include a base and a display operatively coupled by an arm where the display can be oriented in a drawing orientation that includes an angle in a range of approximately 15 degrees to approximately 30 degrees with respect to a plane defined by a footprint of the base.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

While various examples of circuits or circuitry have been discussed, FIG. 13 depicts a block diagram of an illustrative computer system 1300. The system 1300 may be a computer system sold by Lenovo (US) Inc. of Morrisville, N.C. (e.g., a ThinkStation® system); however, as apparent from the description herein, a satellite, a base, a server or other machine may include other features or only some of the features of the system 1400. As described herein, a monitor or machine such as the display 140 and/or the base 130 and/or the display 240 and/or the base 230 may include at least some of the features of the system 1400.

As an example, a monitor may include features such as one or more of the features included in one of the LENOVO® IDEADCENTRE® or THINKCENTRE® "all-in-one" computing devices (e.g., sold by Lenovo (US) Inc. of Morrisville, N.C.). For example, the LENOVO® IDEADCENTRE® A720 computing device includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner.

Figure 14:
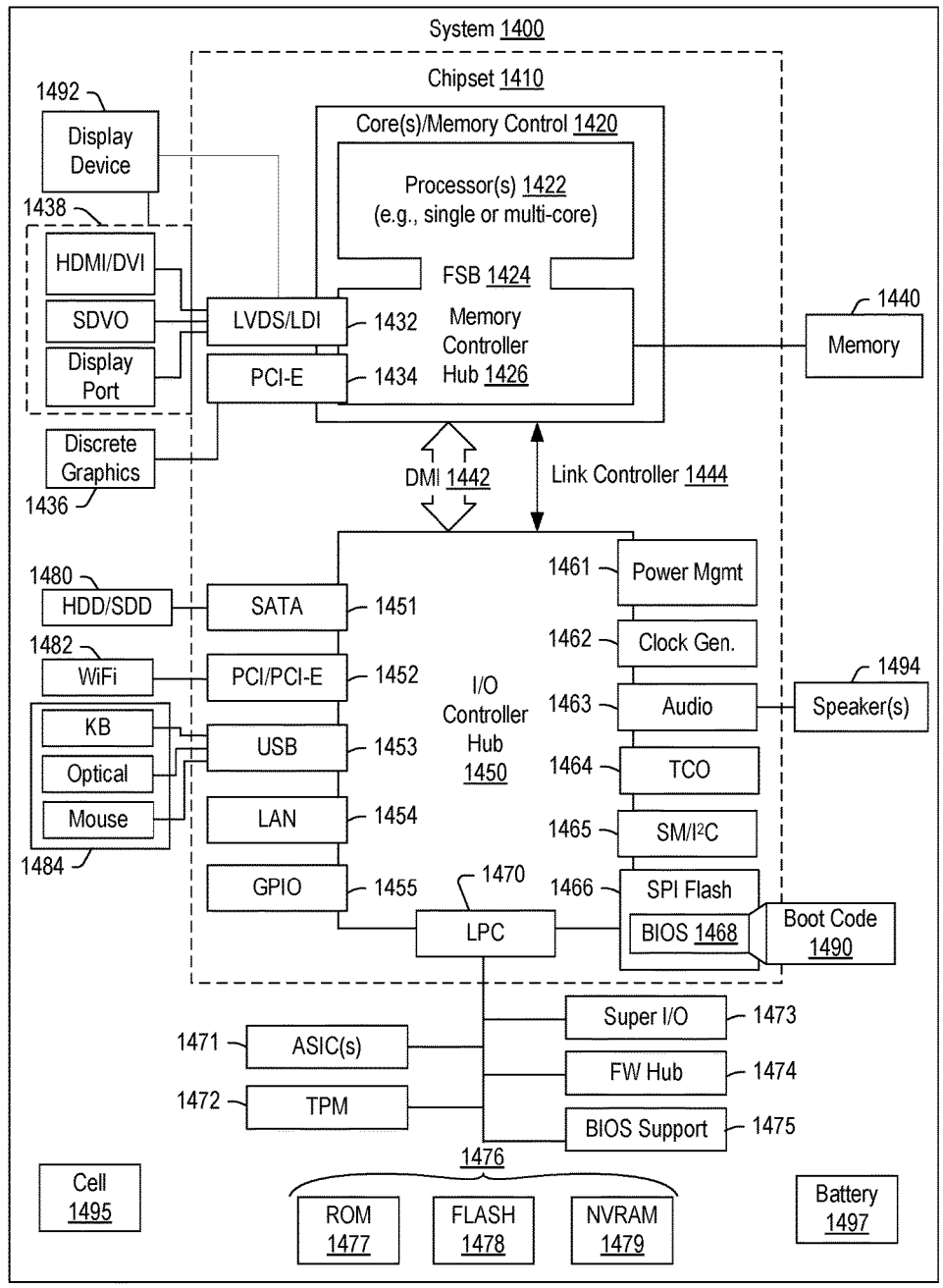
FIG. 14 is a diagram of an example of a system.

As shown in FIG. 14, the system 1400 includes a so-called chipset 1410. A chipset refers to a group of integrated circuits, or chips, that are designed to work together. Chipsets are usually marketed as a single product (e.g., consider chipsets marketed under the brands INTEL®, AMD®, etc.).

In the example of FIG. 14, the chipset 1410 has a particular architecture, which may vary to some extent depending on brand or manufacturer. The architecture of the chipset 1410 includes a core and memory control group 1420 and an I/O controller hub 1450 that exchange information (e.g., data, signals, commands, etc.) via, for example, a direct management interface or direct media interface (DMI) 1442 or a link controller 1444. In the example of FIG. 14, the DMI 1442 is a chip-to-chip interface (sometimes referred to as being a link between a "northbridge" and a "southbridge").

The core and memory control group 1420 include one or more processors 1422 (e.g., single core or multi-core) and a memory controller hub 1426 that exchange information via a front side bus (FSB) 1424. As described herein, various components of the core and memory control group 1420 may be integrated onto a single processor die, for example, to make a chip that supplants the conventional "northbridge" style architecture.

The memory controller hub 1426 interfaces with memory 1440. For example, the memory controller hub 1426 may provide support for DDR SDRAM memory (e.g., DDR, DDR2, DDR3, etc.). In general, the memory 1440 is a type of random-access memory (RAM). It is often referred to as "system memory".

The memory controller hub 1426 further includes a low-voltage differential signaling interface (LVDS) 1432. The LVDS 1432 may be a so-called LVDS Display Interface (LDI) for support of a display device 1492 (e.g., a CRT, a flat panel, a projector, etc.). A block 1438 includes some examples of technologies that may be supported over the LVDS interface 1432 (e.g., serial digital video, HDMI/DVI, display port). The memory controller hub 1426 also includes one or more PCI-express interfaces (PCI-E) 1434, for example, for support of discrete graphics 1436. Discrete graphics using a PCI-E interface has become an alternative approach to an accelerated graphics port (AGP). For example, the memory controller hub 1426 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1450 includes a variety of interfaces. The example of FIG. 14 includes a SATA interface 1451, one or more PCI-E interfaces 1452 (optionally one or more legacy PCI interfaces), one or more USB interfaces 1453, a LAN interface 1454 (more generally a network interface), a general purpose I/O interface (GPIO) 1455, a low-pin count (LPC) interface 1470, a power management interface 1461, a clock generator interface 1462, an audio interface 1463 (e.g., for speakers 1494), a total cost of operation (TCO) interface 1464, a system management bus interface (e.g., a multi-master serial computer bus interface) 1465, and a serial peripheral flash memory/controller interface (SPI Flash) 1466, which, in the example of FIG. 14, includes BIOS 1468 and boot code 1490. With respect to network connections, the I/O hub controller 1450 may include integrated gigabit Ethernet controller lines multiplexed with a PCI-E interface port. Other network features may operate independent of a PCI-E interface.

The interfaces of the I/O hub controller 1450 provide for communication with various devices, networks, etc. For example, the SATA interface 1451 provides for reading, writing or reading and writing information on one or more drives 1480 such as HDDs, SDDs or a combination thereof. The I/O hub controller 1450 may also include an advanced host controller interface (AHCI) to support one or more drives 1480. The PCI-E interface 1452 allows for wireless connections 1482 to devices, networks, etc. The USB interface 1453 provides for input devices 1484 such as keyboards (KB), one or more optical sensors, mice and various other devices (e.g., microphones, cameras, phones, storage, media players, etc.). On or more other types of sensors may optionally rely on the USB interface 1453 or another interface (e.g., I²C, etc.). As to microphones, the system 1400 of FIG. 14 may include hardware (e.g., audio card) appropriately configured for receipt of sound (e.g., user voice, ambient sound, etc.).

In the example of FIG. 14, the LPC interface 1470 provides for use of one or more ASICs 1471, a trusted platform module (TPM) 1472, a super I/O 1473, a firmware hub 1474, BIOS support 1475 as well as various types of memory 1476 such as ROM 1477, Flash 1478, and non-volatile RAM (NVRAM) 1479. With respect to the TPM 1472, this module may be in the form of a chip that can be used to authenticate software and hardware devices. For example, a TPM may be capable of performing platform authentication and may be used to verify that a system seeking access is the expected system.

The system 1400, upon power on, may be configured to execute boot code 1490 for the BIOS 1468, as stored within the SPI Flash 1466, and thereafter processes data under the control of one or more operating systems and application software (e.g., stored in system memory 1440). An operating system may be stored in any of a variety of locations and accessed, for example, according to instructions of the BIOS 1468. Again, as described herein, a satellite, a base, a server or other machine may include fewer or more features than shown in the system 1400 of FIG. 14. Further, the system 1400 of FIG. 14 is shown as optionally include cell phone circuitry 1495, which may include GSM, CDMA, etc., types of circuitry configured for coordinated operation with one or more of the other features of the system 1400.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A computing device comprising:
a processor;
memory accessible by the processor;
a base that comprises a first platform at a first height and a second platform at a second height that differs from the first height;
an arm operatively coupled to the base; and
a display operatively coupled to the processor and operatively coupled to the arm, wherein the arm folds over the first platform.

2. The computing device of claim 1 wherein the first platform comprises a holder for a keyboard.

3. The computing device of claim 2 comprising a keyboard, wherein the keyboard comprises a rechargeable battery and the base comprises charging circuitry for charging the rechargeable battery in an orientation of the computing device where the keyboard is disposed on the first platform.

4. The computing device of claim 3 wherein the charging circuitry comprises wireless charging circuitry.

5. The computing device of claim 2 wherein the base comprises wireless communication circuitry and the keyboard comprises wireless communication circuitry for transmission of information from the keyboard to the base.

6. The computing device of claim 1 wherein the first height is greater than the second height.

7. The computing device of claim 1 wherein the first platform comprises a first area and wherein the second platform comprises a second area wherein the first area is greater than the second area.

8. The computing device of claim 1 wherein the display comprises at least one lamp disposed on a lower portion of the display.

9. The computing device of claim 1 wherein the first platform comprises wireless charging circuitry and wherein the second platform comprises wireless charging circuitry.

10. The computing device of claim 1 wherein the arm comprises an axis of rotation with respect to a lower arm mount and wherein the axis of rotation is at an axis height that is equal to or greater than the first height.

11. The computing device of claim 1 wherein the display comprises a display area that is greater than an area of a footprint of the base.

12. A computing device comprising:
a processor;
memory accessible by the processor;
a base;
a display operatively coupled to the processor, wherein the display comprises a first side and an opposing second side that define a widthwise dimension; and
an arm operatively coupled to the base and operatively coupled to the display, wherein the arm is off-centered with respect to the widthwise dimension of the display toward the second side of the display, wherein the base comprises a recessed platform and wherein, in a folded orientation of the arm, the arm folds over the recessed platform.

13. The computing device of claim 12 wherein the base comprises an elevated platform.

14. The computing device of claim 13 wherein the base comprises a step transition between the elevated platform and the recessed platform.

15. The computing device of claim 12 wherein the display comprises a two-dimensional display area that comprises a widthwise dimension and a dimension orthogonal to the widthwise dimension.

16. A computing device comprising:
a processor;
memory accessible by the processor;
a keyboard;
a base that comprises a first platform at a first height and a second platform at a second height that differs from the first height, wherein the first platform comprises a holder for the keyboard, wherein the keyboard comprises a rechargeable battery and the base comprises charging circuitry for charging the rechargeable battery in an orientation of the computing device where the keyboard is disposed on the first platform, and wherein the charging circuitry comprises wireless charging circuitry;

an arm operatively coupled to the base; and a display operatively coupled to the processor and operatively coupled to the arm.

17. A computing device comprising:

a processor;

memory accessible by the processor;

a base that comprises a first platform at a first height and a second platform at a second height that differs from the first height;

an arm operatively coupled to the base; and a display operatively coupled to the processor and operatively coupled to the arm wherein the display comprises at least one lamp disposed on a lower portion of the display.

18. A computing device comprising:

a processor;

memory accessible by the processor;

a base that comprises a first platform at a first height and a second platform at a second height that differs from the first height, wherein the first platform comprises wireless charging circuitry and wherein the second platform comprises wireless charging circuitry;

an arm operatively coupled to the base; and a display operatively coupled to the processor and operatively coupled to the arm.

19. A computing device comprising:

a processor;

memory accessible by the processor;

a base that comprises a first platform at a first height and a second platform at a second height that differs from the first height;

an arm operatively coupled to the base; and a display operatively coupled to the processor and operatively coupled to the arm, wherein the arm comprises an axis of rotation with respect to a lower arm mount and wherein the axis of rotation is at an axis height that is less than the first height.

20. The computing device of claim 19 wherein the arm folds over the second platform.

\* \* \* \* \*